(12) United States Patent
Neudecker

(10) Patent No.: US 10,709,258 B2
(45) Date of Patent: Jul. 14, 2020

(54) ARRANGEMENTS WITH RESTING UNITS WITH ADJUSTABLE LYING AND SITTING SURFACES AS WELL AS METHOD FOR CONTROLLING RESTING UNITS

(71) Applicant: Rummel Matratzen GmbH & Co. KG, Neustadt a.d. Aisch (DE)

(72) Inventor: Klaus Neudecker, Herzogenaurach (DE)

(73) Assignee: RUMMEL MATRATZEN GMBH & CO. KG, Neustadt A. D. Aisch (DE)

(*) Notice: Subject to any disclaimer, the term of this patent is extended or adjusted under 35 U.S.C. 154(b) by 290 days.

(21) Appl. No.: 15/861,043

(22) Filed: Jan. 3, 2018

(65) Prior Publication Data

US 2018/0125261 A1    May 10, 2018

Related U.S. Application Data

(63) Continuation of application No. PCT/DE2016/100297, filed on Jul. 2, 2016.

(30) Foreign Application Priority Data

Jul. 3, 2015    (DE) .................. 10 2015 110 819

(51) Int. Cl.
*G06Q 10/02* (2012.01)
*A47C 31/12* (2006.01)
(Continued)

(52) U.S. Cl.
CPC .......... *A47C 31/123* (2013.01); *A47C 19/045* (2013.01); *A47C 23/067* (2013.01);
(Continued)

(58) Field of Classification Search
CPC ..... A47C 31/123; A47C 27/15; A47C 19/045; A47C 31/008; A47C 23/067; A47C 20/08; A47C 7/35; G06Q 50/12; G06Q 10/02

See application file for complete search history.

(56) References Cited

U.S. PATENT DOCUMENTS 5,975,634 A * 11/1999 Knoblock .............. A47C 1/023
297/284.7
8,458,042 B1    6/2013 Roberts et al.
(Continued)

FOREIGN PATENT DOCUMENTS

CN        1777381 A      5/2006
CN      104114063 A     10/2014
(Continued)

OTHER PUBLICATIONS

International Search Report in counterpart International Application No. PCT/DE2016/100297, dated Oct. 7, 2016, 4 pages.
(Continued)

*Primary Examiner* — Tejal Gami
(74) *Attorney, Agent, or Firm* — Edell, Shapiro & Finnan, LLC

(57) ABSTRACT

An arrangement having at least one resting unit (B; Hyx) each having a lying/sitting surface (B1) and an actuator (A; A1 . . . ), configured to act on the lying/sitting surface, to adjust a height and/or firmness profile (V1, . . . ). An input value (KG), which corresponds to the standard size of an article of clothing representing a given person in a clothing size system is specified via at least one input unit (EE). A control device (S) derives a control signal (SL) from the input value and outputs the control signal to the actuator, so that the actuator autonomously presets a height/firmness profile, which is adapted to physical body parameters of the person represented by the clothing size, in the lying/sitting (Continued)

surface. A data network (DNi) enables the control unit to output control signals (SLyx) to the actuator of a resting unit (Hyx) selected for the person in such an arrangement.

19 Claims, 4 Drawing Sheets

(51) Int. Cl.
    *A47C 23/06*     (2006.01)
    *A47C 31/00*     (2006.01)
    *A47C 19/04*     (2006.01)
    *A47C 27/15*     (2006.01)
    *A47C 7/35*     (2006.01)
    *A47C 20/08*     (2006.01)
    *G06Q 50/12*     (2012.01)

(52) U.S. Cl.
    CPC ............ *A47C 27/15* (2013.01); *A47C 31/008* (2013.01); *A47C 7/35* (2013.01); *A47C 20/08* (2013.01); *G06Q 10/02* (2013.01); *G06Q 50/12* (2013.01)

(56) References Cited

U.S. PATENT DOCUMENTS

| | | |
|---|---|---|
| 2003/0149576 A1 | 8/2003 | Sunyich et al. |
| 2007/0289067 A1* | 12/2007 | Buchanan ............... A61G 7/015 5/713 |
| 2009/0314354 A1* | 12/2009 | Chaffee ................ G05D 16/208 137/14 |
| 2013/0298332 A1 | 11/2013 | Vanstraelen |
| 2014/0052570 A1 | 2/2014 | Roberts et al. |
| 2016/0236591 A1 | 8/2016 | Lange-Mao et al. |
| 2017/0280889 A1 | 10/2017 | Koch |

FOREIGN PATENT DOCUMENTS

| | | |
|---|---|---|
| DE | 102010021362 A1 | 2/2012 |
| DE | 102014209250 A1 | 4/2015 |
| DE | 102014112548 A1 | 3/2016 |
| EP | 2745745 A1 | 6/2014 |
| WO | 2004080246 A1 | 9/2004 |
| WO | 2016034365 A1 | 3/2016 |

OTHER PUBLICATIONS

Chinese Search Report, Application No. 201680039422.7, dated Dec. 12, 2019, 2 pages.

* cited by examiner

ARRANGEMENTS WITH RESTING UNITS WITH ADJUSTABLE LYING AND SITTING SURFACES AS WELL AS METHOD FOR CONTROLLING RESTING UNITS

CROSS-RELATED REFERENCE

The prior art document DE 10 2014 112 548 A1, which is the priority counterpart to U.S. pre-grant publication US 2017/0280889 A1, discloses a work station chair system, which includes sensor devices to determine the positions of elements of the work station chair and the sitting posture of a user and to derive a position signal. A computing unit generates a feedback signal from the position signal. This feedback signal includes suggestions for possible modifications of the elements of the work station chair and the sitting posture of the user.

FIELD OF THE INVENTION

The invention relates to an arrangement with a resting unit and an arrangement with resting units for at least one person and to an accommodation facility with such a resting unit and a method for controlling an arrangement of resting units, each resting unit having a lying and/or sitting surface with an adjustable height and/or firmness profile.

BACKGROUND

Resting units with lying surfaces for persons come in different shapes for daily use. As a result, the resting units, such as, for example, a mattress, cushion, recliner, couch, ottoman as well as a bed, box spring bed, sofa, divan, allow a person to assume an approximately horizontal or slightly oblique position in order to relax. In this respect it is often desired that the lying surface of the resting unit be adjusted to the individual physical body parameters, for example, the weight and height, of the person resting thereon.

To this end the lying comfort is usually determined by the person in his private life by selecting a resting unit that is constructed in such a way that its resilience is perceived to be comfortable. For this purpose, mattresses are available in varying degrees of firmness, which can be customized by selecting the upholstery materials, which are used in each case, and the design of the internal construction as early as during production. However, such a customized mattress is less suitable or not suitable at all for other persons having different body parameters.

Thus, it is increasingly desired that the lying and/or sitting surface of a resting unit can be custom adjusted by any person resting thereon to his physical body parameters, such as, for example, weight and height, and, if necessary, can be readjusted at any time. To this end, resting units may be equipped with actuators, which can be manually operated or can be controlled by motor drive and which allow, for example, a height and angle adjustment of the entire lying surface or partial zones thereof, for example, in the area of the head, back, pelvis, leg and foot. Thus, it is possible for a person to be able to adjust and, if necessary, to readjust a custom height profile of the lying surface, in particular, as a function of the current subjective lying sensation. With such controllable actuators, it is also possible to adjust the penetration depth of a person or parts of his body, resting on a lying surface, i.e., the firmness or resilience of the lying surface or subzones thereof.

Depending on the type of construction of the respective resting unit, a wide variety of designs are known. Thus, the actuators, acting on the lying and/or sitting surface of the resting unit, may represent, for example, electric drives, which actuate lever mechanisms and worm drives below or in the lying surface. One example thereof is a motor frame, which is used as an adjustable spring suspension underneath a mattress that is placed thereon. The actuators can also represent, for example, pumps, which act on bag-shaped or tube-shaped hollow spaces in the lying and/or sitting surface of a resting unit and which allow a charging or discharging with compressed air or water.

Furthermore, actuators can also generate positioning forces by using other physical principles, for example, using electrostriction or magnetic fields. Furthermore, cable pull systems are also known, by which surface regions, which are located in or below a mattress, may be tightened or loosened via actuators. The devices, mentioned herein, for actuator-controlled adjustment of a height and/or firmness profile in a lying and/or sitting surface are presented merely as examples. Depending on the structural design of the respective resting unit, any device of this kind can also be used in combination in the present invention.

A popular design for such a resting unit is, for example, a bed frame, into which an adjustable slat support with a mattress thereon are inserted. In the case of such a slat support, for example, a back region, pelvic region and foot region, or even individual slats may be designed in such a manner that the height and/or angle can be adjusted. In addition, it may also be possible to adjust dynamically the flexibility of the individual slats and groups of slats. The height and/or firmness profile in and along the lying and/or sitting surface of the mattress, which is usually flexible, can be custom adjusted with such a slat support, which acts as a kind of adjustable spring suspension, by a person with respect to the physical characteristics of the body and the current needs. An adjustable spring suspension of this type may also have, for example, a checkerboard-like pattern of individually controllable surface elements.

Furthermore, adjustable mattresses are known, which are equipped directly with controllable actuators. These actuators may have hollow spaces, which can be supplied, for example, with adjustable compressed air in order to influence the height and/or firmness profile of the lying and/or sitting surface. There also exist mattresses, which are equipped with adjustable lashing elements, in order to be able to adjust the tensile stress in the lying surface zone by zone. Specific combinations of bed frame or bed box with lying cushions, which are placed thereon and which are equipped with or have a variety of setting and adjustment options, are also called box spring beds.

The adjustment of the height and/or firmness profile of the lying surface of a resting unit is made by a person resting thereon in accordance with his personal requirements. For this purpose the available controllable actuators are actuated by the person until a setting of the respective resting unit has been found that is currently subjectively satisfactory. It is also known to save the personal settings, which have been found manually and experimentally in this way, in an electronic device and, if need be, to activate these settings again. Although resting units of this type can be custom parameterized by any person for the respective desired or required lying conditions, there is the drawback, however, that a body-specific setting has to be sought again by each person and can only thereafter be saved using data technology in an electronic device.

The prior art document DE 10 2014 112 548 A1 discloses a work station chair system, which includes sensor devices to determine the positions of elements of the work station chair and the sitting posture of a user and to derive a position signal. A computing unit generates a feedback signal from the position signal. This feedback signal includes suggestions for possible modifications of the elements of the work station chair and the sitting posture of the user.

In response to the display of the feedback signal, the user can actuate the adjustment mechanisms, in order to change elements of the work station chair. Said user can also assume an ergonomically improved sitting posture. The computing unit can derive the feedback signal from a comparison of ergonomic data with reference data, in particular, the physical characteristics of the user. To this end, information about the user's body structure and clothing size can be used. Therefore, a monitoring and messaging system is described that assists a user in finding in an iterative manner an optimal seat setting or, more specifically, seat position.

SUMMARY

An object of the present invention is to further develop an arrangement with one or more resting units of the type described above in such a way that an advanced parameterization of a person-specific height and/or firmness profile of the lying and/or sitting surface of a resting unit is easily possible.

This and other objects are achieved by arrangements of resting units and accommodation facilities as described and claimed herein.

In one aspect, the invention offers the special advantage that it is possible for any person to preset by himself the lying and/or sitting surface in such a way that said lying and/or sitting surface assumes a height and/or firmness profile, which is adapted to the respective person, by entering the standard size of the clothing worn by said person. The clothing size lends itself particularly well to a universal and accurate input value, which is readily available for each person, in order to make a customized basic adjustment in the height and/or firmness profile of the respective resting unit. For example, short and light or tall and heavy people do not have to make any time-consuming changes in the controllable actuators of a resting unit, in order to put their sitting or lying surface into a matching state.

In particular, the clothing size values of a unified, standardized clothing size system are suitable as the input values. In this case the individual size values consisting of the characterizing physical dimensions, such as, for example, the chest, waist and gluteal circumference; the body height; the arm length; the inseam length of the leg; the weight; the body measurements; the upper body, waist, and hip width, etc., are derived, for example, from a large number of test persons. In addition, the different body parameters of men, women and children, as well as people from various regions of the world can also be taken into consideration at the same time. Thus, in particular, the international clothing sizes, i.e., the input values, such as XS, S, M, L, XL, XXL, and the national clothing sizes, for example, German, French, Italian, British and American standard sizes are used as the clothing size systems. In the context of the present invention the sizes of the footwear can also be used as the standard size of an article of clothing of a person; in particular, the shoes can be used as an input value. In addition, aspects of the invention make it possible for a person to use any selected, in particular, easy to read clothing size. Thus, the person can readily, so to say, establish his physical characteristics, for example, via the size of the outerwear being worn, for example, the shirts or blouses, the sportswear or business clothing, for example, the suits or skirts, with an arrangement of the invention.

The invention, in certain aspects, makes an automatic, individualized presetting of the resting units for persons possible, in particular, of beds with mattresses and slatted frames and box spring beds without the respective person having to have already occupied the resting unit. As a result, it is possible to plan and organize the prefabrication of the height and/or firmness profile, which is adapted to a specific person, in a lying and/or sitting surface already long before the time of the actual use of a correspondingly adjustable resting unit by the person. Certain aspects of the invention lend themselves particularly well to accommodation facilities with a plurality of preferably identical resting units, for example, hotels. As a result, it is possible to improve the user comfort for guests and to facilitate the organization of the operational procedures by being able to preset the resting units for any guest quickly and effectively at any time in all rooms.

In an advantageous further development of the invention the advanced parameterization of a resting unit, i.e., so to speak, the ordering of a customized lying comfort, can be done in a simple and fast way by the guest himself through the use of a personal mobile device, such as, for example, a mobile phone or smartphone that can be coupled through a wireless network to the control unit of the arrangement. Alternatively, e.g. when the guest is in the reception area, the advanced parameterization according to some aspects of the invention can also be done for the guest. In this case the input value for a clothing size can be determined completely automatically and transmitted via data technology to the control unit of the arrangement according to further aspects of the invention.

The inventive method for controlling an arrangement of resting units makes the advanced parameterization of the resting units, described above, much easier. Thus, the entry of an input value for the clothing size and its automatic further processing can also be performed over the internet by a person, in particular, in the course of going through a reservation procedure for an accommodation in a hotel. In this case personal HMI devices can be used as the input unit, in particular, personal computers, which can be temporarily connected via data technology over the internet to the control unit of the arrangement. When making such a booking, the clothing size for an autonomous presetting of a height and/or firmness profile in the desired lying and/or sitting surface can also be entered as a simple addition to this already required specification, in particular, the selection of a resting unit of a specific category, for example, in a particular room.

The invention, according to another aspect, also makes a simplification of the furnishing, in particular, in a hotel possible. Thus, in an advantageous embodiment of the invention, uniform, for example, foam-like, lying pads can be used as the resting units with matching lying parameters, which have the same, preferably middle firmness value. This is particularly advantageous when using a combination of mattress and spring suspension, for example, with adjustable slatted frame as the controllable resting unit. Mattresses of this type are inexpensive to buy and can be replaced on a routine basis.

BRIEF DESCRIPTION OF THE DRAWINGS

Aspects of the invention and exemplary advantageous embodiments thereof are described in greater detail below through exemplary embodiments shown in the figures. The drawings show in FIG. 1 in schematic form a lateral sectional view of an inventive arrangement with a single resting unit.

DETAILED DESCRIPTION

Figure 1:
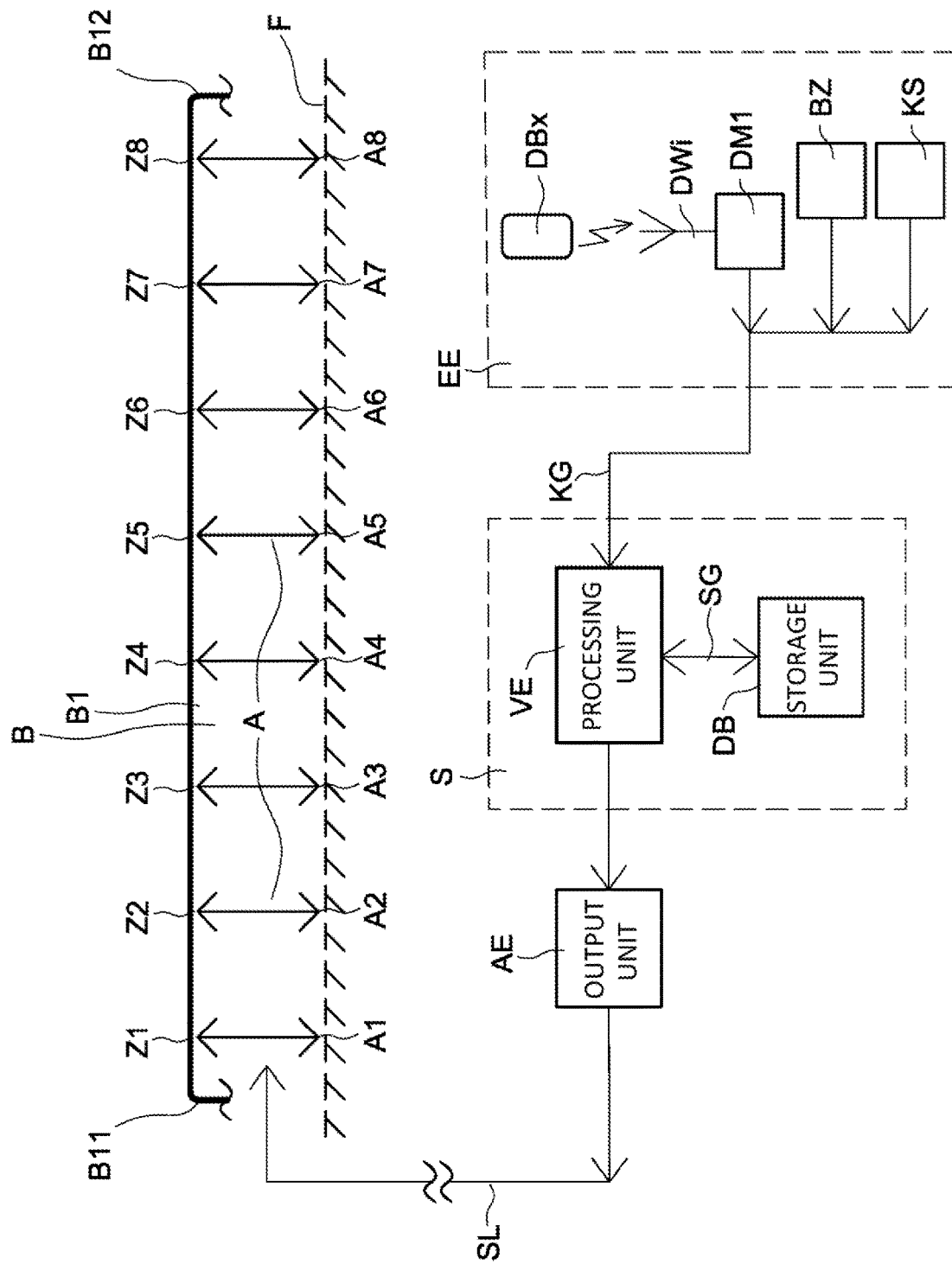

FIG. 1 shows in schematic form an inventive arrangement with a self-sufficient, stand-alone resting unit B. This resting unit has a particularly upholstered lying and/or sitting surface B1, on which one or more persons can lie down and can also, for example, temporarily sit.

At least one actuator A can act on the lying and/or sitting surface B1 of the one resting unit B, in order to adjust a custom height and/or firmness profile, which is adapted to the physical body parameters of the respective person, in the lying and/or sitting surface. In this case the at least one actuator is supported on a supporting surface F, represented symbolically, for example, a floor. In this way it is possible for a person, who has taken a seat on one side of the lying and/or sitting surface or has lain down preferably horizontally thereon, to sink in anatomically and to relieve the strain on individual body parts or to support them in a targeted way. Therefore, depending on the physical body parameters of the respective person, such as, for example, height, weight, sex and body shape, said person can occupy a lying position that is particularly comfortable, ergonomic and healthy.

In the example shown in FIG. 1, a plurality of separately controllable actuators A are arranged preferably in such a way that they are preferably approximately evenly distributed over the entire lying and/or sitting surface B1 between the opposite edges B11 and B12. If the illustrated lying and/or sitting surface B1 is the upper support side, for example, of a mattress, then the edges B11 and B12 may be associated with a head and foot end. In this case the individual actuators A1, A2, A3, A4, A5, A6, A7 and A8, which serve merely as examples, act on different zones Z1, Z2, Z3, Z4, Z5, Z6, Z7 and Z8 in the lying and/or sitting surface. If the resting unit B, shown merely as an example in FIG. 1, is a bed with a lying mattress, then the zones Z1 to Z8 and the engagement areas of the individual actuators can extend in strips across the surface B1 and can be assigned to, for example, a head, shoulder, back, lumbar, gluteal, upper leg, lower leg and foot region.

In FIG. 1, the action arrows of the actuators A1 . . . A10, which extend approximately orthogonal to the supporting surface F, serve merely as examples. In other embodiments, which are not shown herein, the actuators may also be distributed differently and may act on the lying and/or sitting surface in different spatial directions. Depending on the mechanical structure and the physical operating principle of the respective actuators, said actuators may also be arranged, for example, in such a way that they are distributed in a laterally horizontal manner or in the form of a matrix in a checkerboard manner over a wide area and may act on specific points of the lying and/or sitting surface.

According to one formulation of the invention, the arrangement from FIG. 1 is equipped, in particular, with an electronic input unit EE and a control unit S. With such an electronic input unit a person may enter an input value KG, which corresponds to the standard size of an article of clothing of this person in a clothing size system, via data technology into a control unit S. The control unit S derives the control signals SL for the actuators A from the input value KG of the clothing size and outputs said control signals to the actuators A1 . . . A8, so that a height and/or firmness profile, which is adapted to the physical body parameters of the person, represented by the clothing size, can be preset automatically in the lying and/or sitting surface B1.

Thus, aspects of the invention make possible an autonomous setting of a profile, i.e., in particular, a fully automated, individualized and fast advance parameterization of the lying parameters of the lying and/or sitting surface. This aspect saves a person from having to first adjust by himself, with difficulty, e.g. through trial and error, a custom lying posture by manually and successively actuating possibly a plurality of actuators. Typically this preadjustment may already be performed so properly using the input value of the clothing size that a person rarely has to make fine adjustments by manually readjusting again. This aspect of the invention allows a person to make a fast and accurate preadjustment already before said person has used the resting unit. If the arrangement according to the invention is in a sleeping room, for example, a hotel room, then the advanced parameterization of the lying parameters of the lying and/or sitting surface can be performed by a person ahead of time, e.g., at check-in or upon entering the room, by simply entering his clothing size into the input unit.

Thus, the arrangement, according to the invention, is suitable for use in accommodation facilities, such as, for example, hotels and hostels, but also hospitals, sanitariums, passenger ships, wide-bodied aircraft, bivouacs, camps, settlements. These facilities have a plurality of resting units, for examples, beds, which are used by ever-changing individuals with varying physical body parameters. The invention can significantly enhance the user comfort in such large facilities. One particularly advantageous further embodiment of this kind will be explained in more detail below with reference to the example shown in FIG. 6.

FIG. 1 also shows by way of an example a particularly advantageous embodiment of the invention. In this case the control unit S also has a storage unit DB, in which for each standard size value in a clothing size system an associated data record SG is stored. A processing unit VE, which is connected to the input unit EE, reads out the data record SG, which correlates to an input value KG, derives the associated control signals SL for the actuators A, and outputs said control signals to the actuators A, in order to carry out an automatic preadjustment. Then the lying and/or sitting surface B1 of the resting unit assumes, according to this aspect of the invention, the height and/or firmness profile that is adapted to the entered clothing size and the physical body parameters, represented by said clothing size, of the associated person.

In an advantageous embodiment, which has also been already shown in the example in FIG. 1, the control signals are emitted by an additional output unit AE, which forms from the said control signals the control signals SL, which lend themselves well to directly driving the actuators A that act on the lying and/or sitting surface B1. Thus, these control signals are advantageously already adapted through signal technology to the respective physical operating principle of the actuators used and allow a direct, immediate actuation of the same.

According to the invention, the input values KG correspond to the standard size from a clothing size system. In this case any possible clothing size system can be taken into consideration and can be stored, for example, in the form of data records SG in the storage unit DB. It is particularly easy for a person to read out the current size value, for example, of a personal article of clothing and to communicate this using the input unit of the arrangement according to the invention. International clothing size systems for men, women and children can be used as the clothing size system. It is also possible to use national clothing size systems, for example, German, English, French and Italian standard size systems, or, for example, shoes and sportswear size systems. The invention allows a person to parameterize the actuators through an input value of a clothing size system, for example, for women's, men's or children's outerwear, for women's or men's pants, for shirts or sportswear in such a way that that a custom height and/or firmness profile is preset in the lying and/or sitting surface.

Control signals SL, which can be found empirically, for example, from a series of measurements with test persons and which are allocated to individual clothing sizes, can be saved in the storage unit DB for the respective actuators. Thus, serial measurements can be carried out with the lying and/or sitting surface of a resting unit with people, who have clothing sizes that cover perhaps the entire range of values of a clothing size system. For each of these persons a custom adapted height and/or firmness profile, which is perceived by said person to be comfortable, can be determined and saved.

The input unit EE can have, for example, a local operating element BZ, which is connected directly to the control unit S. If in this case said operating element is, for example, a hardwired manually operated unit, then a person can enter his clothing size, for example, with a keyboard or a screen menu directly on site, for example, next to the resting unit B. A manually operated unit also allows the person to make in an easy way, if necessary, manual corrections in the settings of the lying and/or sitting surface.

In an additional embodiment of the invention the personal electronic devices of a person, who wishes to use the resting unit, may also be used as the input unit EE. Thus, personal mobile devices DBx, for example, mobile phones or smartphones, tablets, notebooks, etc., which can be coupled via a wireless network DWi and a first data interface DM1 to the control unit S of the arrangement from FIG. 1, can be used to enter the clothing size.

In another embodiment, which has already been shown in FIG. 1, of the invention the required input value of the clothing size can also be sensed through measurement technology, in particular, with a label reader KS and can be fed to the control unit. With such an input unit, the sensing and entering of the clothing size are further automated, so that manual input, e.g., through a keyboard, is no longer necessary.

Such a label reader KS can be designed in different ways. For instance, said label reader can automatically sense the required clothing size value, for example, when the respective person enters or removes his outerwear in a hotel room that is equipped with an arrangement according to the invention, and can transmit totally automatically said clothing size value to the control unit.

Figure 2:
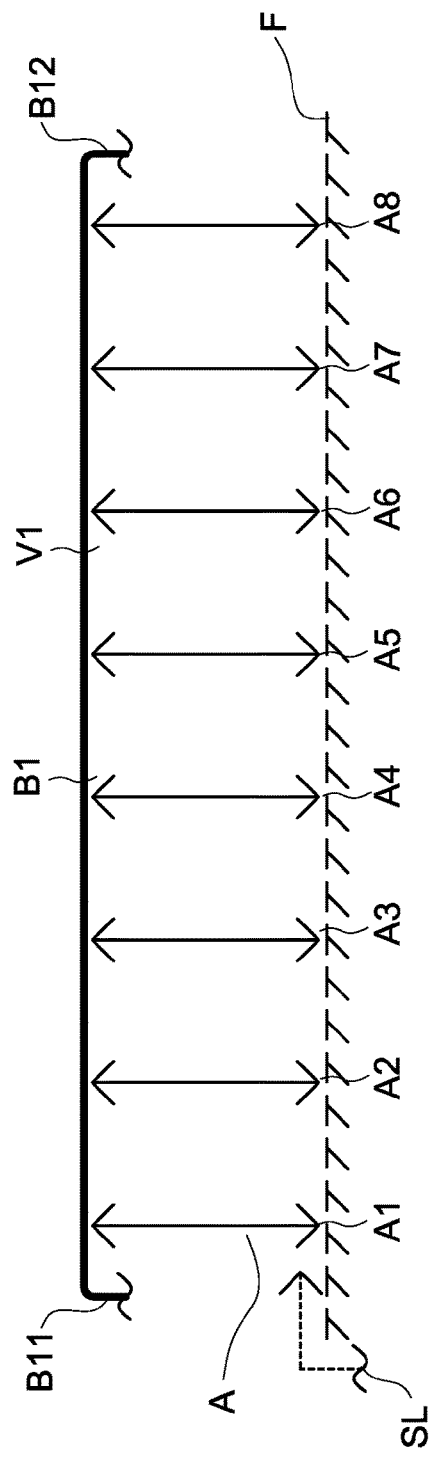
FIG. 2 in schematic form by way of an example a first height profile in the resting unit from FIG. 1.

FIG. 2 shows, as an example, a first height profile V1 of an exemplary resting unit B in an arrangement according to the invention. In this case all of the actuators A are controlled in the same way, so that the lying and/or sitting surface B1 of the resting unit B is approximately a plane and extends parallel to a supporting surface F. Such a uniform raising or lowering of the entire lying and/or sitting surface can be affected, for example, by driving all of the actuators A1, A2, A3, A4, A5, A6, A7 with the same control signal over the signal line SL. This feature makes it advantageously possible to adjust, for example, the sitting height at one edge B11, B12 to the body height of a person, i.e., to raise for a tall person and to lower for a short person. In particular, this aspect can help older people in getting in and out of a resting unit that is used as a bed.

In another height profile the lying and/or sitting surface B1 also forms approximately a plane. In this case the actuators can be driven in such a way that the entire lying and/or sitting surface occupies a tilt angle, i.e., is slanted towards the supporting surface F. If the edge B12 represents, for example, the foot region of a bed, then it can be lowered, for example, relative to the edge B11 at the head region.

Figure 3:
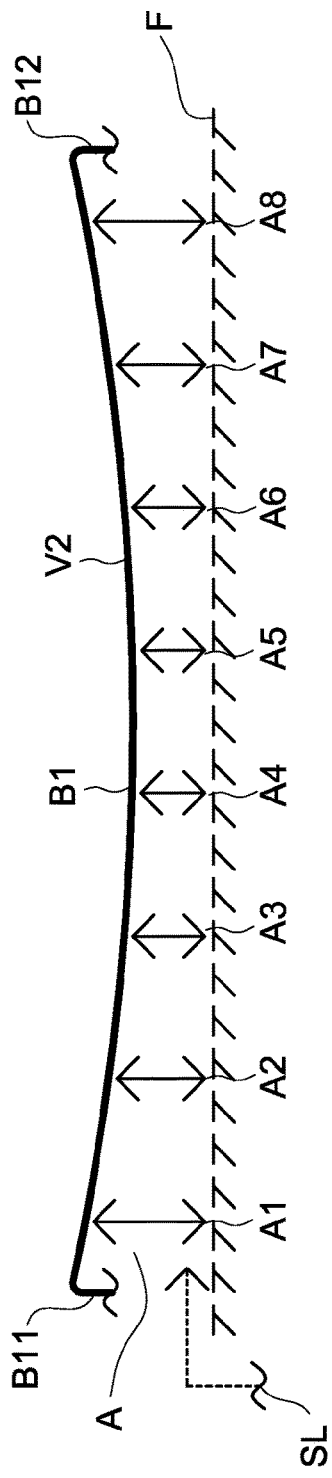
FIG. 3 in schematic form by way of an example a second height profile in the resting unit from FIG. 1.

FIG. 3 shows, as an example, another height profile V2. In this case the actuators, lying opposite in mirror image to the top and bottom edge B11, B12, are driven in pairs towards the center of the lying and/or sitting surface B1 in different ways. Thus, the actuators A1, A8 are activated more than the actuators A2, A7. The actuators A3, A6, which lie further inwards, are only slightly activated; and the actuators A4, A5, which act on the center of the lying and/or sitting surface, are located in a bottom home position. In this way the lying and/or sitting surface occupies a trough-shaped, approximately symmetrically convex profile, which is comparable to a hammock. It is also possible to adjust the height profiles with an undulating contour of the lying and/or sitting surface, which approximates the silhouette of a person lying on a side.

Figure 4:
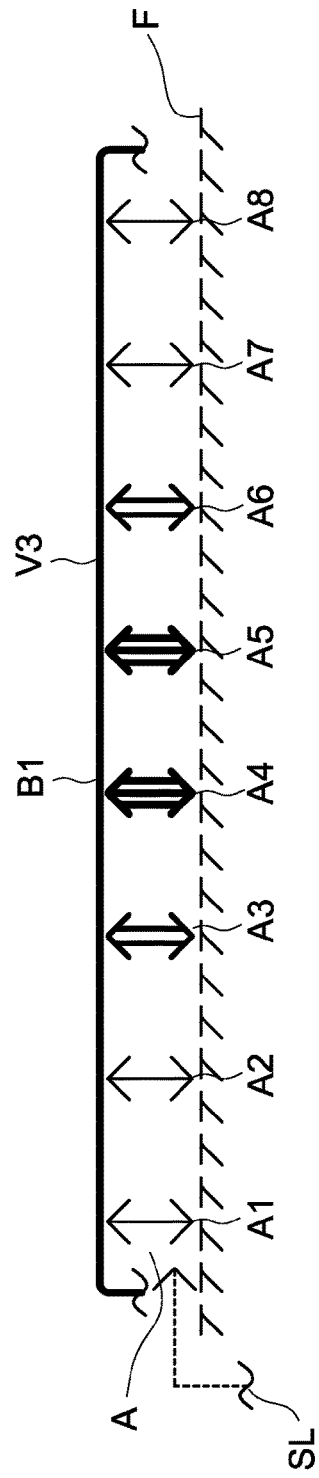
FIG. 4 in schematic form by way of an example a firmness profile in the resting unit from FIG. 1.

FIG. 4 shows, as an example, a firmness profile V3 of a resting unit B in an arrangement according to the invention. In this case the actuators A are driven over the signal line SL in such a way that the lying and/or sitting surface resists pressure loads, which act from the top, preferably zonally different resistances, which are symbolized in FIG. 4 by showing the arrows in different ways and by different line thicknesses. As a result, an actuator, which is represented by an arrow having a thick multi-line, generates a higher resistance and, thus, a higher degree of firmness in the lying and/or sitting surface than an actuator, which is represented by an arrow with fewer lines in a thinner line width.

Thus, in the example shown in FIG. 4, the actuators A4, A5 generate a higher degree of firmness than the respective adjacent actuators A3, A6. The actuators A1, A2 and A7, A8 generate the least firmness. Such a firmness profile reduces the degree to which the gluteal and lumbar vertebral regions of a person will sink in without adversely affecting the resilience in the head, shoulder and leg regions associated with the actuators A1, A2 and A7, A8. The respective actuators A3, A6 that lie in-between adjust the middle firmness values in the transition areas of the lying and/or sitting surface. In practice it is particularly advantageous to drive the actuators in such a way that both the height and firmness profile of a lying and/or sitting surface can be adjusted in combination. Such a design results from a superimposition, for example, of the representations in FIGS. 3 and 4.

Figure 5:
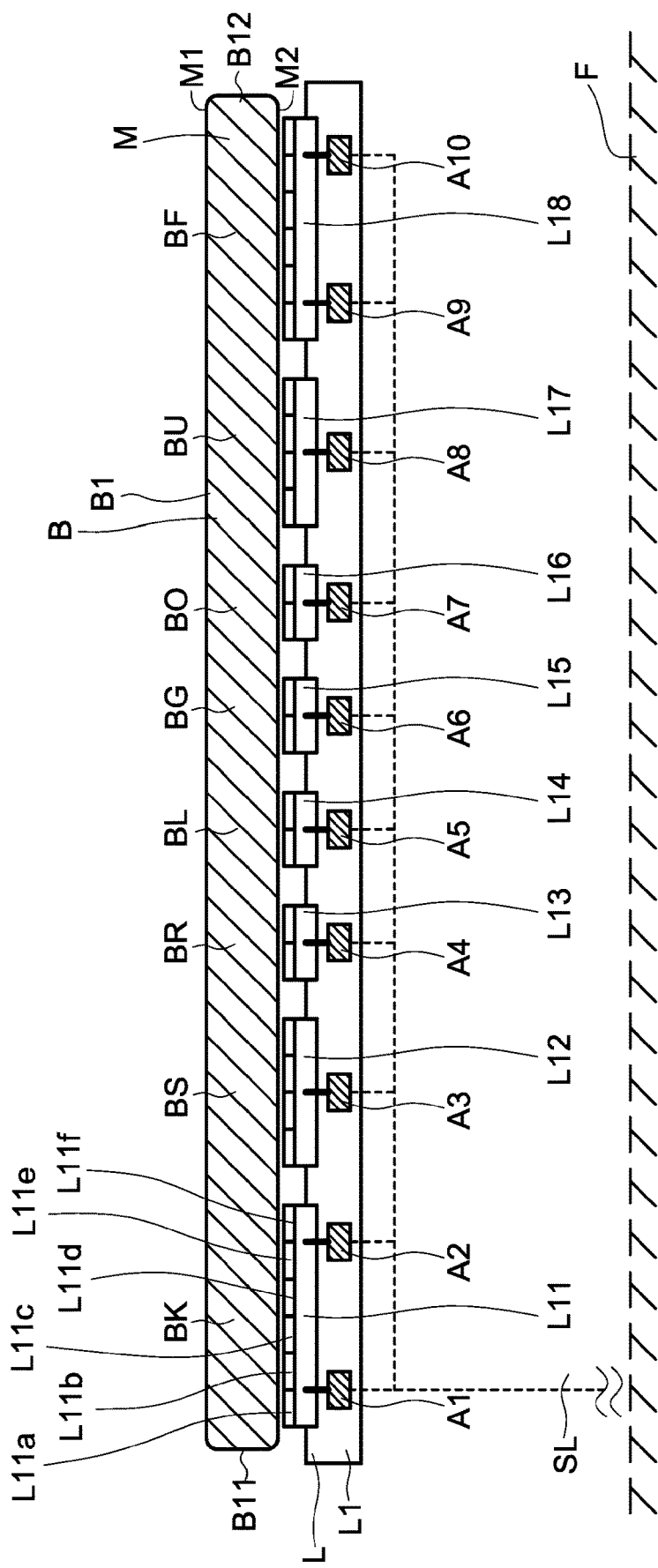
FIG. 5 in schematic form a lateral sectional view of a preferred embodiment of a resting unit with a mattress and a spring suspension, which can be adjusted using actuators.

FIG. 5 shows in schematic form a lateral sectional view of a particularly advantageous resting unit B for an arrangement according to the invention. In this case the lying and/or sitting surface B1 is designed as an upper sitting and lying side M1 of a mattress M. The mattress M is advantageously placed on an adjustable spring suspension advantageously in the form of a slatted frame L, on which the actuators for adjusting a height and/or firmness profile of the lying and/or sitting surface of the mattress act. The slatted frame L has partial spring areas, which extend across the width of the mattress M, support said mattress in sections and are connected to a frame L1. In the example shown in FIG. 5, the partial spring areas have several transverse slats, which make contact with the support underside M2 of the mattress M. Thus, for example, the partial spring area L11 comprises the transverse slats L11a, L11b, L11c, L11d, L11e, L11f. Each of the partial spring areas is associated with at least one actuator for adjusting the height and/or the firmness in the respective partial spring area. The partial spring areas are dimensioned and arranged over the entire length of the mattress M between the upper and lower edge B11, B12 preferably in conformity with the body regions of a person.

Thus, for example, the partial spring area L11 is disposed in the head region of the mattress M and is adjustable through the actuators A1, A2. The partial spring area L12 is disposed, for example, in the shoulder region BS and is adjustable by the actuator A3. The partial spring area L13 is disposed in the back region BR and is adjustable by the actuator A4. The partial spring area L14 is disposed in the lumbar region and is adjustable by the actuator A5. Furthermore, in the exemplary embodiment shown in FIG. 5, the partial spring area L15 is disposed in the gluteal region BG of the mattress M and is adjustable by the actuator A6; and the partial spring area L16 is disposed in the upper leg region and is adjustable by the actuator A7; and the partial spring area L17 is disposed in the lower leg region BU and is adjustable by the actuator A8; and the partial spring area L18 is disposed in the foot region BF of the mattress M and is adjustable by the actuators A9, A10.

The arrangement of at least two actuators per partial spring area makes it possible to adjust both the height and the firmness of the respective partial spring area. As a result, a plurality of individual adjustments, adapted to the physical body parameters of a person, of the lying and/or sitting surface are possible. Thus, the height of the partial spring areas can be varied with respect to each other, for example, in a step-like or ramp-like manner. Furthermore, an approximately upright sitting position can be specified for a person, for example, in the region of the upper body; an elevated lying position of the legs can be specified in the foot region; and a higher degree of firmness can be specified in the pelvic region. In an additional embodiment both the partial spring areas as well as their transverse slats can be adjusted separately, in order to generate a height and/or firmness profile. Another embodiment includes at least one adjustable mattress, on which the controllable actuators for adjusting a height and/or firmness profile act directly. Such an arrangement can be employed, for example, in box spring beds.

In one embodiment according to the invention with a resting unit in the form of an adjustable spring suspension, on which the actuators act, and a mattress, which is placed on said spring suspension, it is particularly advantageous if the mattress M has a lying firmness in a mid range of values; and the actuators can be controlled, starting from a home position, in such a way that an increasing or decreasing height and/or firmness profile of the lying and/or sitting surface of the mattress is adjustable. With such an arrangement it is possible to adjust a very finely graduated height and/or firmness profile of the lying and/or resting surface with a very wide range of values. In addition, such a mattress, which has a medium firmness, is particularly adaptable. Therefore, in such a case the actuators, starting from a central zero position, can selectively harden or soften the lying and/or sitting surface of the mattress in selected regions. In addition, such a mattress is usually easy to construct and, therefore, cost effective. In particular, when using a plurality of arrangements in an accommodation facility, it is, therefore, economically possible to replace such mattresses on a routine basis for reasons of hygiene.

Figure 6:
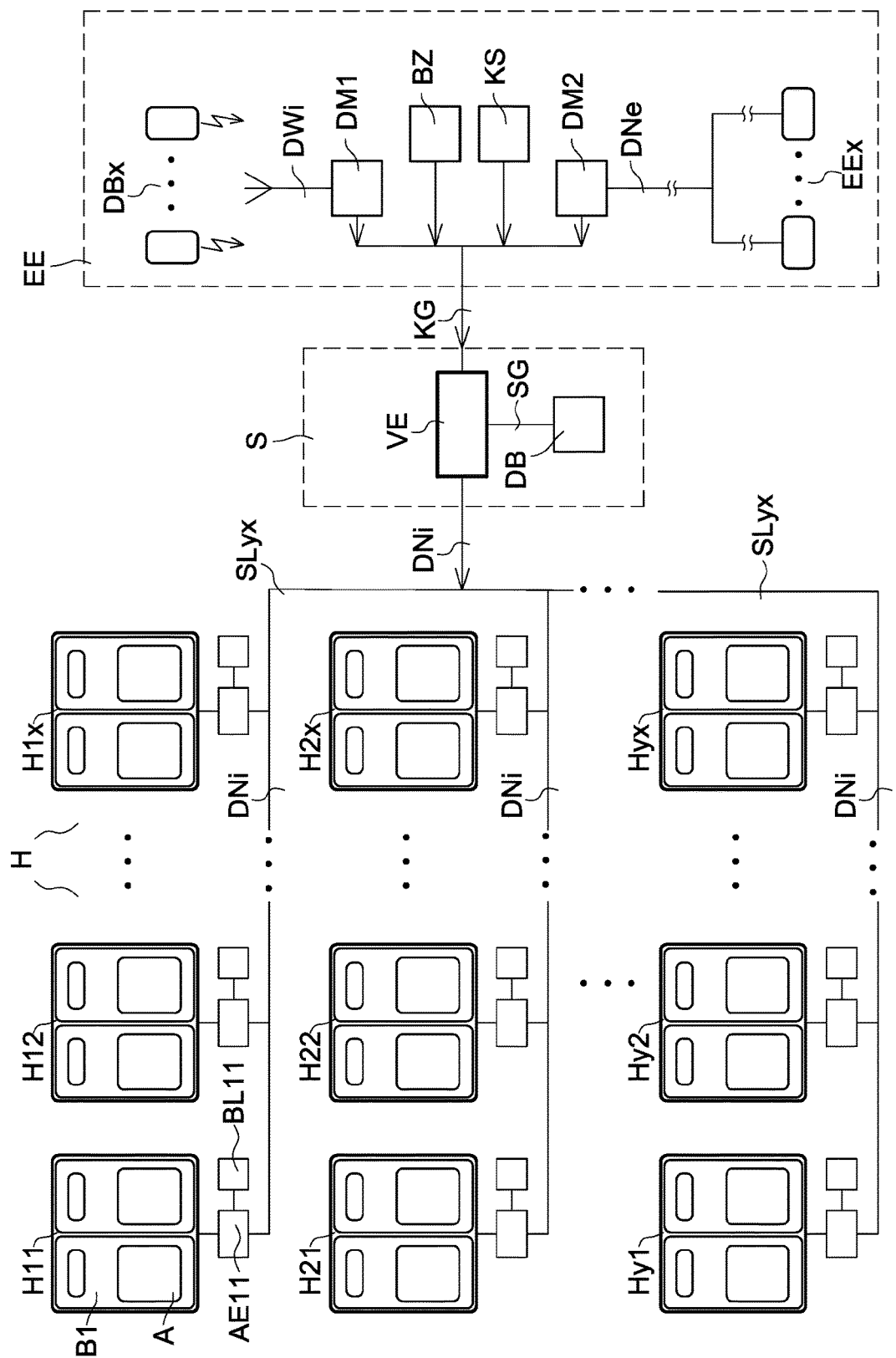
FIG. 6 a block diagram of an inventive arrangement with a plurality of resting units of preferably the same type of construction, in particular, in an accommodation facility for persons, for example, a hotel.

FIG. 6 shows a block diagram of an arrangement H according to the invention with a plurality of adjustable resting units of preferably the same type of construction. Such an embodiment lends itself especially well to use in an accommodation facility for people. In this case it may be a hotel, hospital or sanitarium, i.e., a facility for the temporary accommodation of a large number of frequently changing persons, patients and guests. Such an arrangement with a possibly large number of resting units for at least one person can also occur with other facilities, for example, in a passenger ship, wide-bodied aircraft, a settlement of block houses, belonging to a group, in a holiday and leisure facility and many more. In all of these cases a significant simplification of the operation of the adjustable resting units and an improvement in the lying and/or sleeping comfort for users can be achieved.

Thus, in the block diagram, shown in FIG. 6 as an example, the resting units H11, H12 . . . H1x are disposed, for example, in a first unit, for example, on a first floor of a building; the resting units H21, H22 . . . H2x are disposed in a second unit, for example, on another floor of the building, and the resting units Hy1, Hy2 . . . Hyx are disposed in another unit, for example, another building of a complex of several contiguous buildings. Each of these resting units has at least one lying and/or sitting surface B1 for at least one person. With least one actuator A, which can act on the lying and/or sitting surface B1, a customized adjustment of the height and/or firmness profile of the lying and/or sitting surface is possible in turn as a function of a clothing size as the input value.

While in the case of the embodiment according to the invention that is shown in FIG. 1, it is possible for a person to enter with the aid of a local input unit the input value of the clothing size into the control unit on the spot, i.e., in the immediate vicinity of the associated resting unit, the embodiment, shown in FIG. 6, offers a so-called network solution.

In this case the input unit EE, which is shown in the example of FIG. 6, for an input value KG, which in turn corresponds to the standard clothing size of a particular article of clothing for a specific person in a clothing size system, are arranged preferably centrally and make possible a data-technical coupling to each individual resting unit selected in the arrangement H. For this purpose the input unit EE is connected to each resting unit Hyx through a control unit S, which in turn is preferably central, and a data network DNi. This situation is shown by way of an example for all of the resting units Hyx at the resting unit H11. In this case the control signal SLyx, provided for the resting unit H11, is read out, for example, from the data network DNi by a local output unit AE11 and is fed to the at least one actuator A, in order to be able to suitably preset there the lying and/or sitting surface B1. An additional local operating element BL11, for example, a manually operated device, allows a person, if necessary, to make fine adjustments in the height and/or firmness profile of the lying and/or sitting surface B1 of the resting unit H11.

The control unit S in the example of FIG. 6 is preferably constructed in the same manner as has already been described in conjunction with the example of the control unit S in FIG. 1, but is centrally disposed between the input unit EE and the interface to the data network DNi. This control unit in turn derives from an input value KG a control signal SLyx for the at least one actuator A in a selected resting unit Hyx, so that via this control signal it is possible to preset autonomously a height and/or firmness profile, which is adapted to the physical body parameters of the person represented by the clothing size, in an associated lying and/or sitting surface B1. The control signal SLxy, which is formed in such a way, is outputted by the control unit Sz over the data network DNi to the at least one actuator A of a resting unit Hyx, which was assigned to the specific person or was selected specifically by this person.

These embodiments according to the invention allow a higher ranking entry of the input values of the clothing sizes for any person as well as the distribution and targeted delivery of a control signal, derived therefrom, to a resting unit, for example, in a reserved hotel room, which is assigned specifically to this person. For this purpose it is possible to use as an input unit EE, for example, an operating element BZ at a reception of an accommodation facility, for example, a central keyboard. Examples of input units EE that can also be used include personal mobile devices DBx of those persons, who have booked a resting unit, for example, in a hotel. Some examples of mobile devices that can be used include smartphones, tablet PCs and other wireless HMI devices that in the example of FIG. 6 are connected to the control unit through data technology via a wireless network DWi and a first data interface DM1, for example, a wireless modem.

The implementation of an arrangement according to the invention, which is shown in the example in FIG. 6 and which is, so to speak, networked through data technology, offers the additional special feature that it is also possible to use as the input unit (EE) personal HMI devices EEx, in particular, personal computers, which can be coupled to the control unit S via the internet DNe and a second data interface DM2. This feature allows customers, who book a stay in a hotel by way of, for example, an internet portal to specify via an additional input of the personal clothing size at the same time a customized height and firmness profile in the lying and/or sitting surface of the resting unit, which will be used by said customers during their intended hotel stay.

In addition to these advantages, which will benefit, in particular, all those people who want to use an arrangement according to the invention, further aspects of the invention also offer benefits to, for example, the operator of an accommodation facility, equipped with arrangements according to the invention. Thus, all of the resting units, in particular, their cushions and mattresses, may be configured so as to be identical. This makes it considerably easier to purchase, clean and, if required, replace them. Preferably the lying and/or sitting surfaces of resting units in an idle state of the actuators have at least one matching lying parameter, in particular, the same firmness value. In addition, said lying and/or sitting surfaces may be made of the same materials that have been previously tested, for example, for environmental compatibility, durability and for the absence of hazardous substances.

LIST OF REFERENCE NUMERALS AND CHARACTERS

B resting unit
B1 lying and/or sitting surface
B11, B12 edges, in particular, head and foot end
BK head region
BS shoulder region
BR back region
BL lumbar region
BG gluteal region
BO upper leg region
BU lower leg region
BF foot region
Z zones
Z1, Z2 . . . Z8 first, second, . . . eighth zone
A actuators
A1, A2 . . . A10 first, second . . . tenth actuator
M mattress
M1 upper sitting and lying side
M2 support underside
L slatted frame
L1 frame
L11 . . . L18 partial spring areas
L11a . . . L11f transverse slats in the first partial spring area L11
F supporting surface
V1, V2 first, second height profile
V3 firmness profile
EE input unit
KG input value for a clothing size
BZ operating element, for example, manual operation or central keyboard
KS label reader, for example, in a central access area
DM1 first data interface, for example, a wireless modem
DWi wireless network
DBx personal mobile devices, for example, smartphones
DM2 second data interface, for example, a network modem
DNe communication network, for example, internet
EEx personal HMI devices, for example, decentralized PCs
S control unit
VE processing unit
DB storage unit for clothing sizes and control variables
SG data records for clothing sizes
AE output unit at resting unit B
SL control signal for the at least one actuator in B
AE11 output unit at resting unit H11
SLyx control signal for the at least one actuator in H11
H arrangement with resting units, for example, in hotel, hostel, hospital, passenger ship, wide-bodied aircraft, settlement
H11, H12 . . . H1x resting units with actuators in a first unit
H21, H22 . . . H2x resting units with actuators in a second unit
Hy1, Hy2 . . . Hyx resting units with actuators in other units
DNi data network
BL11 local operating element of the resting unit H11

What is claimed is:

1. An arrangement, comprising:
 a resting unit for at least one person, comprising
  at least one lying and/or sitting surface,
  at least one actuator configured to act on the lying and/or sitting surface, to preset a height and/or firmness profile for a given person,
  at least one input unit configured to receive an input value which corresponds to a specified standard size of an article of clothing of the given person in a clothing size system, and
 a control unit which comprises
  a storage unit which contains data records for a plurality of standard sizes in the clothing size system, and a processing unit which reads out from the storage unit
a given data record associated with the input value
that corresponds to the clothing size of the given
person, derives a control signal from the given data
record, and outputs the control signal to the at least
one actuator to control the actuator to autonomously
preset the height and/or firmness profile, which is
adapted to physical body parameters of the given
person represented by the specified standard clothing
size, for the lying and/or sitting surface.

2. An arrangement, comprising:
a plurality of resting units respectively for at least one
person, wherein each resting unit comprises
at least one lying and/or sitting surface and
at least one actuator configured to act on the lying
and/or sitting surface to adjust a height and/or firmness profile,
at least one input unit configured to receive an input value
which corresponds to a specified standard size of an
article of clothing of a given person in a clothing size
system, and
a central control unit which comprises
a storage unit which contains data records for a plurality of standard sizes in the clothing size system, and
a processing unit which reads out from the storage unit
a given data record associated with the input value
that corresponds to the clothing size of the given
person, derives a control signal for the at least one
actuator, and outputs the control signal to control the
at least one actuator of a selected one of the plurality
of resting units, to preset the height and/or firmness
profile of the at least one lying and/or sitting surface
of the selected resting unit autonomously, which
height and/or firmness profile is adapted to physical
body parameters of the given person represented by
the specified standard clothing size, and
a data network connecting the central control unit to the
plurality of resting units, over which the central control
unit outputs the control signal to the at least one
actuator of the at least one resting unit selected from the
plurality of resting units for the given person.

3. The arrangement as claimed in claim 2, wherein
the lying and/or sitting surfaces of the resting units in an
idle state of the actuators have respective matching
lying parameters.

4. The arrangement as claimed in claim 3, wherein the
respective matching lying parameters have mutually same
firmness values.

5. The arrangement as claimed in claim 2, wherein the
input units comprise
respective personal human-machine-interface (HMI)
devices coupled to the central control unit over the
internet and a second data interface.

6. The arrangement as claimed in claim 5, wherein
at least some of the personal HMI devices comprise
respective personal computers.

7. The arrangement as claimed in claim 2, wherein the
input units comprise
respective personal mobile devices coupled to the central
control unit via a wireless network and a first data
interface.

8. The arrangement as claimed in claim 7, wherein
the respective personal mobile devices comprise mobile
phones and/or smart phones.

9. The arrangement as claimed in claim 1, wherein the
resting unit further comprises
at least one mattress with the at least one lying and/or
sitting surface, and
an adjustable spring suspension of the mattress, on which
the at least one actuator adjusting the height and/or
firmness profile in the lying and/or sitting surface of the
mattress acts.

10. The arrangement as claimed in claim 9, further
comprising
an adjustable slatted frame configured as an adjustable
spring suspension.

11. The arrangement as claimed in claim 9, wherein
the mattress has a lying firmness in a mid range of values,
and
the actuators are configured to be controlled, starting from
a home position, such that the height and/or firmness
profile in the lying and/or sitting surface of the mattress
increases or decreases.

12. An accommodation facility for people, comprising:
a plurality of resting units each for at least one respective
person, wherein each resting unit comprises
at least one lying and/or sitting surface and
at least one actuator configured to act on the lying
and/or sitting surface to adjust a height and/or firmness profile,
at least one input unit configured to receive an input value
which corresponds to a specified standard size of an
article of clothing of a respective given person in a
clothing size system, and
a central control unit which comprises
a storage unit which contains data records for a plurality of standard sizes in the clothing size system,
and
a processing unit which reads out from the storage unit
a given data record associated with the input value
that corresponds to the clothing size of the respective
given person, derives a control signal for the at least
one actuator, and outputs the control signal to control
the at least one actuator of a selected one of the
plurality of resting units, to preset the height and/or
firmness profile of the at least one lying and/or sitting
surface of the selected resting unit autonomously,
which height and/or firmness profile is adapted to
physical body parameters of the respective given
person represented by the specified standard clothing
size, and
a data network connecting the central control unit to the
plurality of resting units, over which the central control
unit outputs the control signal to the at least one
actuator of the at least one resting unit selected from the
plurality of resting units for the respective given person.

13. The accommodation facility for people, as claimed in
claim 12, configured as a commercial hotel.

14. A method for controlling an arrangement comprising
a plurality of resting units respectively for at least one
person, wherein each resting unit comprises at least one
lying and/or sitting surface with an adjustable height and/or
firmness profile, comprising:
specifying an input value which corresponds to a specified
standard size of an article of clothing of a given person
in a clothing size system,
deriving a control signal from the input value, which
control signal is configured to preset the height and/or
firmness profile of the at least one lying and/or sitting
surface of at least one of the resting units autonomously, which profile is adapted to physical body parameters of the given person represented by the specified standard clothing size, and outputting the control signal to the at least one resting unit, which is selected for the given person, of the arrangement.

15. The method as claimed in claim 14, wherein the input value is specified by the given person over the internet.

16. The method as claimed in claim 14, wherein the input value is specified by the given person via a personal mobile device.

17. The method, as claimed in claim 16, comprising a mobile phone or smartphone as the personal mobile device.

18. The arrangement as claimed in claim 1, wherein the processing unit controls the actuator exclusively in accordance with the control signal.

19. The method as claimed in claim 14, further comprising:

only following said specifying, deriving and outputting steps, providing the given person physical access to the lying and/or sitting surface of the at least one resting unit.

* * * * *